(12) United States Patent
Mucha et al.

(10) Patent No.: US 11,367,084 B2
(45) Date of Patent: Jun. 21, 2022

(54) COMMUNICATION BETWEEN CUSTOMIZATION PLATFORM AND CUSTOMIZABLE ELEMENTS

(71) Applicant: AppDirect, Inc., San Francisco, CA (US)

(72) Inventors: Bartlomiej Mucha, Montreal (CA); Cedric Dugas, Varennes (CA)

(73) Assignee: AppDirect, Inc., San Francisco, CA (US)

( * ) Notice: Subject to any disclaimer, the term of this patent is extended or adjusted under 35 U.S.C. 154(b) by 7 days.

(21) Appl. No.: 16/915,436

(22) Filed: Jun. 29, 2020

(65) Prior Publication Data
US 2021/0406921 A1    Dec. 30, 2021

(51) Int. Cl.
*G06Q 30/00* (2012.01)
*G06Q 30/02* (2012.01)
*G06F 16/9535* (2019.01)
*H04L 67/02* (2022.01)
*G06Q 30/06* (2012.01)

(52) U.S. Cl.
CPC ......... *G06Q 30/02* (2013.01); *G06F 16/9535* (2019.01); *G06Q 30/0601* (2013.01); *H04L 67/02* (2013.01)

(58) Field of Classification Search
CPC ................ G06Q 30/02; G06Q 30/0601; G06F 16/9535; H04L 67/02
See application file for complete search history.

(56) References Cited

U.S. PATENT DOCUMENTS

| | | | | |
|---|---|---|---|---|
| 9,244,660 | B2* | 1/2016 | Chauhan | G06F 16/958 |
| 9,646,103 | B2* | 5/2017 | Benjamin | G06F 16/986 |
| 10,678,995 | B2* | 6/2020 | Sisson | G06F 16/972 |
| 2002/0054084 | A1 | 5/2002 | Udell | |
| 2005/0198124 | A1 | 9/2005 | McCarthy | |
| 2009/0019372 | A1 | 1/2009 | Chu et al. | |

(Continued)

OTHER PUBLICATIONS

Chang, Ling-Hua, Sanjiv Behl, and Tung-Ho Shieh. "W-Revised: An amazing tool for creating customized websites." The 2014 2nd International Conference on Systems and Informatics (ICSAI 2014). IEEE, 2014.*

(Continued)

*Primary Examiner* — Kathleen Palavecino
(74) *Attorney, Agent, or Firm* — McDermott Will & Emery LLP

(57) ABSTRACT

Various aspects of the subject technology relate to systems, methods, and machine-readable media for customizing a website. The method includes receiving, from a provider, a message comprising message data, the message data comprising an identifier and parameters relating to a customizable website element of the website. The method also includes identifying, through a consumer, the customizable website element based on at least one of a message type of the message or the identifier of the message data. The method also includes routing, through the consumer, the message to the customizable website element based on at least one of the message type of the message or the identifier of the message data. The method also includes implementing, through the consumer, the parameters to the customizable website element based on the identifier.

20 Claims, 12 Drawing Sheets

(56) References Cited

U.S. PATENT DOCUMENTS

| | | |
|---|---|---|
| 2009/0083383 A1 | 3/2009 | Piper et al. |
| 2013/0080928 A1 | 3/2013 | Zhuang et al. |
| 2013/0212524 A1* | 8/2013 | Nurse .................... G06F 40/106 |
| | | 715/788 |
| 2014/0380229 A1* | 12/2014 | Volodin ................ G06F 3/0482 |
| | | 715/780 |

OTHER PUBLICATIONS

USPTO, International Search Report and Written Opinion dated Oct. 4, 2021, for related International Application No. PCT/US2021/039452, 8 pgs.

* cited by examiner

COMMUNICATION BETWEEN CUSTOMIZATION PLATFORM AND CUSTOMIZABLE ELEMENTS

TECHNICAL FIELD

The present disclosure generally relates to customization of websites, and more particularly to a customization platform for implementing customizations into websites.

BACKGROUND

The Internet has become an important part of everyday life. Websites, which are accessed through the Internet, typically include a collection of webpages with content. Each website may be identified by a domain name and may be published to the Internet through web server(s). Websites may be designed in various ways to be dedicated to a particular topic or purpose. For example, websites are commonly dedicated to news, education, commerce, entertainment, social networking, etc. Users may typically access web sites through web browsers installed on a range of devices, including desktops, laptops, tablets, and smartphones.

BRIEF SUMMARY

The subject disclosure addresses the shortcomings in existing technologies by providing for a website customization platform that allows decision-makers to customize website components with minimal technical knowledge. According to an aspect, a provider posts a message to a consumer. The consumer may listen for any messages posted by the provider. On message arrival, the consumer may route what to do with message data based on a message type and an element identifier. The consumer may distribute the message data to multiple elements based on the message type. The consumer may also distribute the message data to only one element with a unique identifier. Customizable website elements may then utilize the message data accordingly for implementing customizations to the customizable website elements.

According to one embodiment of the present disclosure, a computer-implemented method is provided for customizing a website. The method includes receiving, from a provider, a message comprising message data, the message data comprising an identifier and parameters relating to a customizable website element of the website. The method also includes identifying, through a consumer, the customizable website element based on at least one of a message type of the message or the identifier of the message data. The method also includes routing, through the consumer, the message to the customizable website element based on at least one of the message type of the message or the identifier of the message data. The method also includes implementing, through the consumer, the parameters to the customizable website element based on the identifier.

According to one embodiment of the present disclosure, a system is provided including a processor and a memory comprising instructions stored thereon, which when executed by the processor, causes the processor to perform a method for customizing a website. The method includes receiving, from a provider, a message comprising message data, the message data comprising an identifier and parameters relating to a customizable website element of the website. The method also includes identifying, through a consumer, the customizable website element based on at least one of a message type of the message or the identifier of the message data. The method also includes routing, through the consumer, the message to the customizable website element based on at least one of the message type of the message or the identifier of the message data. The method also includes implementing, through the consumer, the parameters to the customizable website element based on the identifier.

According to one embodiment of the present disclosure, a non-transitory computer-readable storage medium is provided including instructions (e.g., stored sequences of instructions) that, when executed by a processor, cause the processor to perform a method for customizing a website. The method includes receiving, from a provider, a message comprising message data, the message data comprising an identifier and parameters relating to a customizable website element of the website. The method also includes identifying, through a consumer, the customizable website element based on at least one of a message type of the message or the identifier of the message data. The method also includes routing, through the consumer, the message to the customizable website element based on at least one of the message type of the message or the identifier of the message data. The method also includes implementing, through the consumer, the parameters to the customizable website element based on the identifier.

According to one embodiment of the present disclosure, a system is provided that includes means for storing instructions, and means for executing the stored instructions that, when executed by the means, cause the means to perform a method for customizing a website. The method includes receiving, from a provider, a message comprising message data, the message data comprising an identifier and parameters relating to a customizable website element of the website. The method also includes identifying, through a consumer, the customizable website element based on at least one of a message type of the message or the identifier of the message data. The method also includes routing, through the consumer, the message to the customizable website element based on at least one of the message type of the message or the identifier of the message data. The method also includes implementing, through the consumer, the parameters to the customizable website element based on the identifier.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
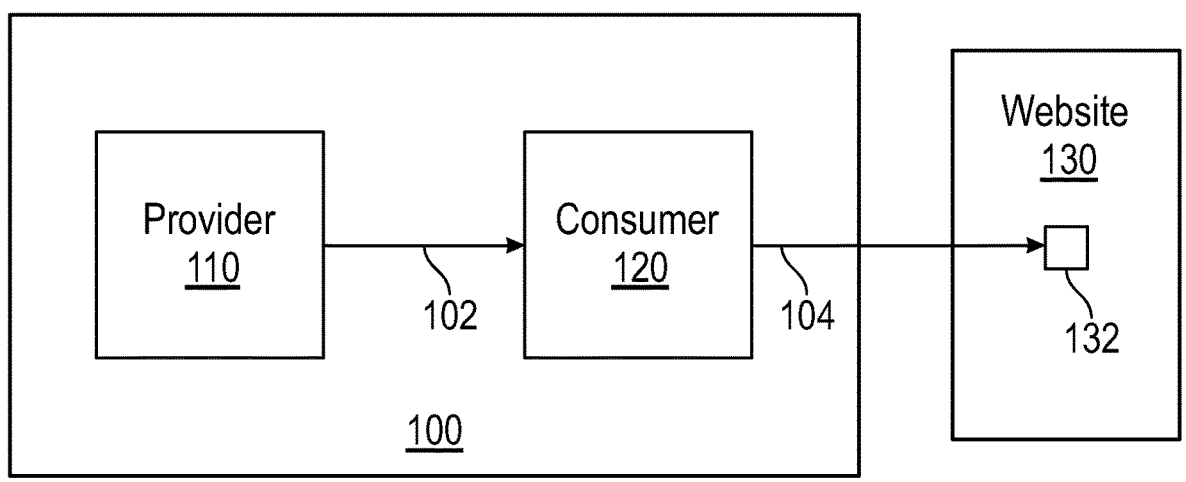
FIG. 1 illustrates an exemplary website customization platform, according to certain aspects of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

The Internet has become an important part of everyday life. Websites, which are accessed through the Internet, typically include a collection of webpages with content. Each website may be identified by a domain name and may be published to the Internet through web server(s). Websites may be designed in various ways to be dedicated to a particular topic or purpose. For example, websites are commonly dedicated to news, education, commerce, entertainment, social networking, etc. Users may typically access web sites through web browsers installed on a range of devices, including desktops, laptops, tablets, and smartphones.

Website design is important because it controls how content is presented to users. Website administrators typically control the design and content of each website. However, it is difficult for lay persons to customize the websites themselves without the help of website administrators. Therefore, there is a need for a highly customizable platform that provides a safe and simple way for lay persons to customize their websites with minimal aid from website administrators.

Aspects of the present disclosure address these issues by providing for a website customization platform that allows decision-makers to customize website components with minimal technical knowledge. According to aspects, a provider posts a message to a consumer. The consumer may listen for any messages posted by the provider. On message arrival, the consumer may route what to do with message data based on a message type and an element identifier. The consumer may distribute the message data to multiple elements based on the message type. The consumer may also distribute the message data to only one element with a unique identifier. Customizable website elements may then utilize the message data accordingly for implementing customizations to the customizable website elements.

In an implementation, a customization platform may include a provider and a consumer. The consumer may include a single customizable element or a set of customizable elements embedded onto the customization platform, which may point to a website with customizable website elements. The customizable element may be wrapped by a message listener. The customizable element may also be one of many customizable elements that may be identified globally by a primary message listener (e.g., a window message listener), which then routes/distributes message/data to the appropriate message listener depending on the message/data. The message may be defined by an element identifier, and data/parameters for that element. To differentiate the type of message for a single element, the message may also specify a message type. Each message listener may then decide how to route/distribute the message/data based on at least one of the element identifier or message type. According to an aspect, the listeners may be combined within one environment. According to an aspect, a format for the data/parameters may be unified/standardized and known between the provider and the consumer. This way, it will be clear what the consumer is expecting from the provider so that the consumer may implement the website customizations based on the data/parameters. According to aspects, a live preview of the implemented changes may be instantly displayed that does not affect a production environment of the website.

The disclosed system addresses a problem in traditional website design tied to computer technology, namely, the technical problem of customizing a website by lay persons with minimal technical web design knowledge. The disclosed system solves this technical problem by providing a solution also rooted in computer technology, namely, by providing for a website customization platform. The disclosed subject technology further provides improvements to the functioning of the computer itself because it improves processing and efficiency in website design.

FIG. 1 illustrates an exemplary website customization platform 100, according to certain aspects of the disclosure. The website customization platform 100 may include a provider 110 and a consumer 120. For example, the provider 110 may include a user interface, and the consumer 120 may include an HTML element (e.g., an iframe).

According to aspects, a user may utilize the provider 110 to implement customizations to a customizable website element 132 of a website 130. For example, the user may generate a message 102 through the provider 110. The message 102 may include message data having an identifier and parameters 104 relating to the customizable website element 132 of the website 130. The consumer 120 may listen for the message 102 that is posted by the provider 110. Once the message 102 is received, the consumer 120 may cause the parameters 104 to be implemented to the customizable website element 132 of the website 130 based on the identifier.

According to aspects, the customizable website element 132 may include a schema. The schema may include form input that that will show up in the user interface (e.g., editor) of the provider 110. For example, the customizable website element 132 may relate to a website element for displaying images, such as a slider/carousel element for images. The slider/carousel element may include a user-configurable number of images to be displayed and additional user-configurable settings (e.g., slider/carousel behavior, structure, size, etc.) that may be defined by a user via the user interface of the provider 110.

In an implementation, the number of images and/or the additional settings may be defined as variables in the schema for the slider/carousel element. The user may select specific values for each of these variables based on the schema from a drop down menu. For example, the user may select a number of images to be displayed in the slider/carousel element from a drop down menu (e.g., choosing a value of 1 to 10, or more from the drop down menu). The user may similarly select additional settings from another drop down menu dedicated to the settings (e.g., choosing behavior, structure, size, etc.). Once selected, the slider/carousel element of the webpage/website 130 will be updated in real-time to reflect the number of images to be displayed, as well as any additional settings that were selected. For example, these changes may be viewed as a preview through a preview panel of the user interface. The user may then decide whether to publish the changes based on the preview. It is understood that the described customizable website elements 132 are exemplary only, and other website elements, including, but not limited to, branding, logos, color schemes, products, fonts, font sizes, webpage background colors, webpage images, text, etc., may be customizable as well without departing from the scope of the disclosure.

According to aspects, each website may have multiple components (e.g., customizable website elements 132) that may be changed based on user inputs. Each of these components may include a component identifier, such that there is a one-to-one correlation between website components and component identifiers. For example, even when there are multiple components of a same type (e.g., multiple slider/carousel elements), each of these components will have their own unique component identifier.

In an implementation, the message 102 may include the component identifier (e.g., identifier) to aid in identifying which specific website component is being modified. For example, once the message 102 is received by the consumer 120, the consumer 120 may check the component identifier to confirm that it is the correct website component that is being modified. Once verified, the consumer 120 will proceed with implementing the changes (e.g., proceeding with bussing information, managing values, or any other values that were already provided, the modified website component itself, etc.). In this way, the consumer 120 may automatically verify that the message 102 is intended for the website component, which improves dependability of the platform 100.

According to aspects, the consumer 120 may include specific listeners (e.g., listener types) for specific components. For example, the listeners may listen for specific messages relating to specific components. Once a listener for a specific component detects a message relating to the specific component, the consumer 120 will execute implementation of the component by routing the message 102 to the appropriate component and updating the component based on the message data (e.g., parameters 104).

According to aspects, the message 102 may include a message type. For example, there may be at least two types of messages 102. A first message type may include code for logic-specific implementation, such as a number of elements/pictures in a slider. A second message type may be directed to portal styling. For example, Cascade Style System (CSS) may be leveraged to implement styling and rendering of specific components, including, but not limited to, page background, font face, size-based color, menu button colors/functions, etc. In this way, the message type may aid in facilitating implementation of the changes.

According to aspects, the platform 100 may include webpage/website templates that may be utilized by a user to build their own webpage/website with customizable elements. The templates may also include elements that are not customizable (e.g., webpage/website layout). The templates may be configurable and selectable by users. For example, the user may select a template that allows for customization of sliders/carousels and other website components, but does not allow for customization of a layout. In this way, there will be correlation between what the user customizes through the user interface and implementation of the customizations on the website 130. This also prevents attempted modifications of components that are not customizable. It is understood that any webpage/website component/element/layout may be designated as customizable or not customizable. In this way, the user would not need to know how to build a website from scratch. The user may simply follow a template to designate customizations.

According to additional aspects, a format for the data/parameters 104 may be unified/standardized and known between the provider 110 and the consumer 120. This way, it will be clear what the consumer 120 is expecting from the provider 110 so that the consumer 120 may implement the website customizations based on the data/parameters 104.

Figure 2A:
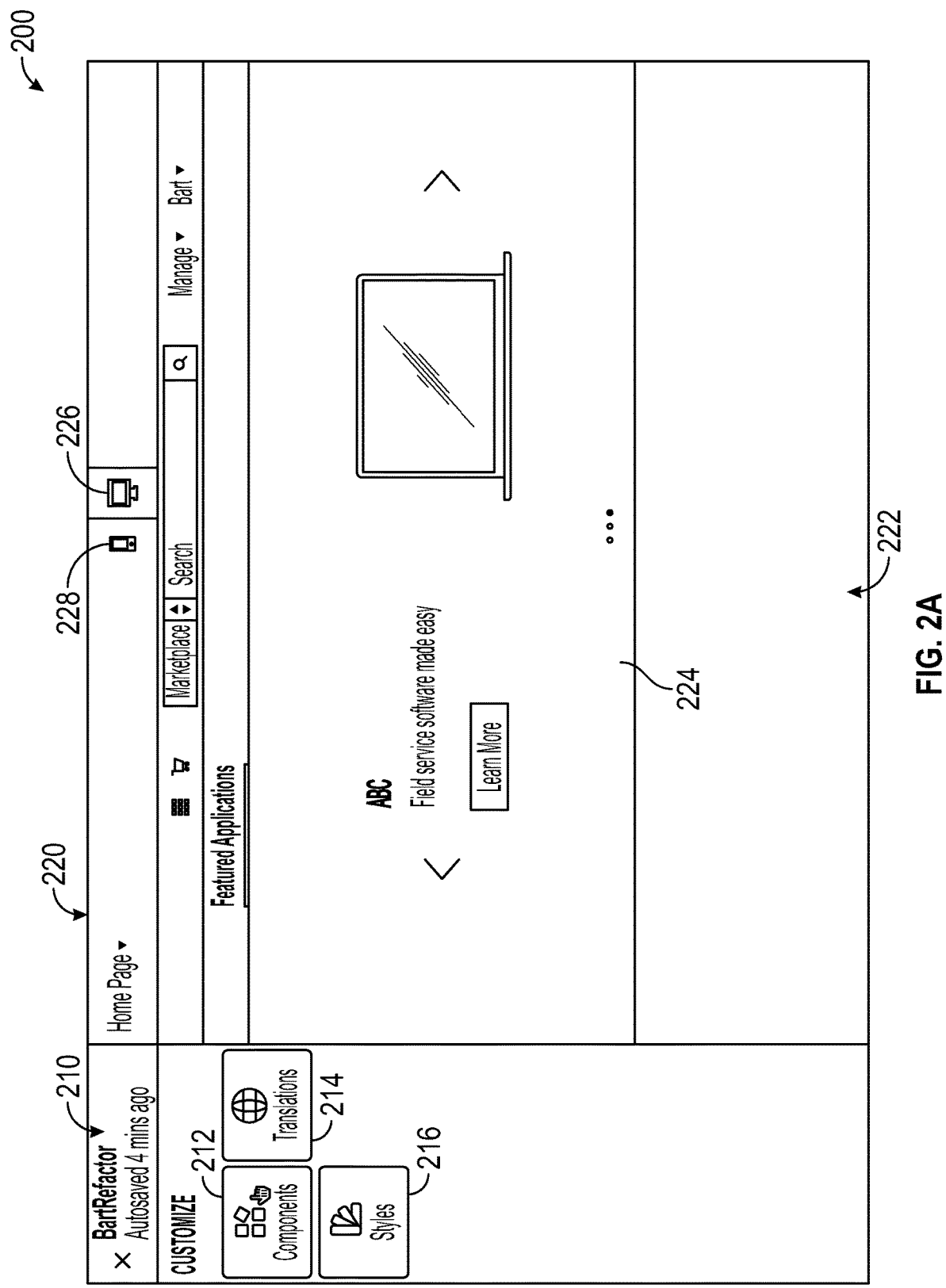
FIGS. 2A-2C illustrate exemplary graphical user interfaces (GUIs) for customizing website elements, according to certain aspects of the disclosure.
Figure 2B:
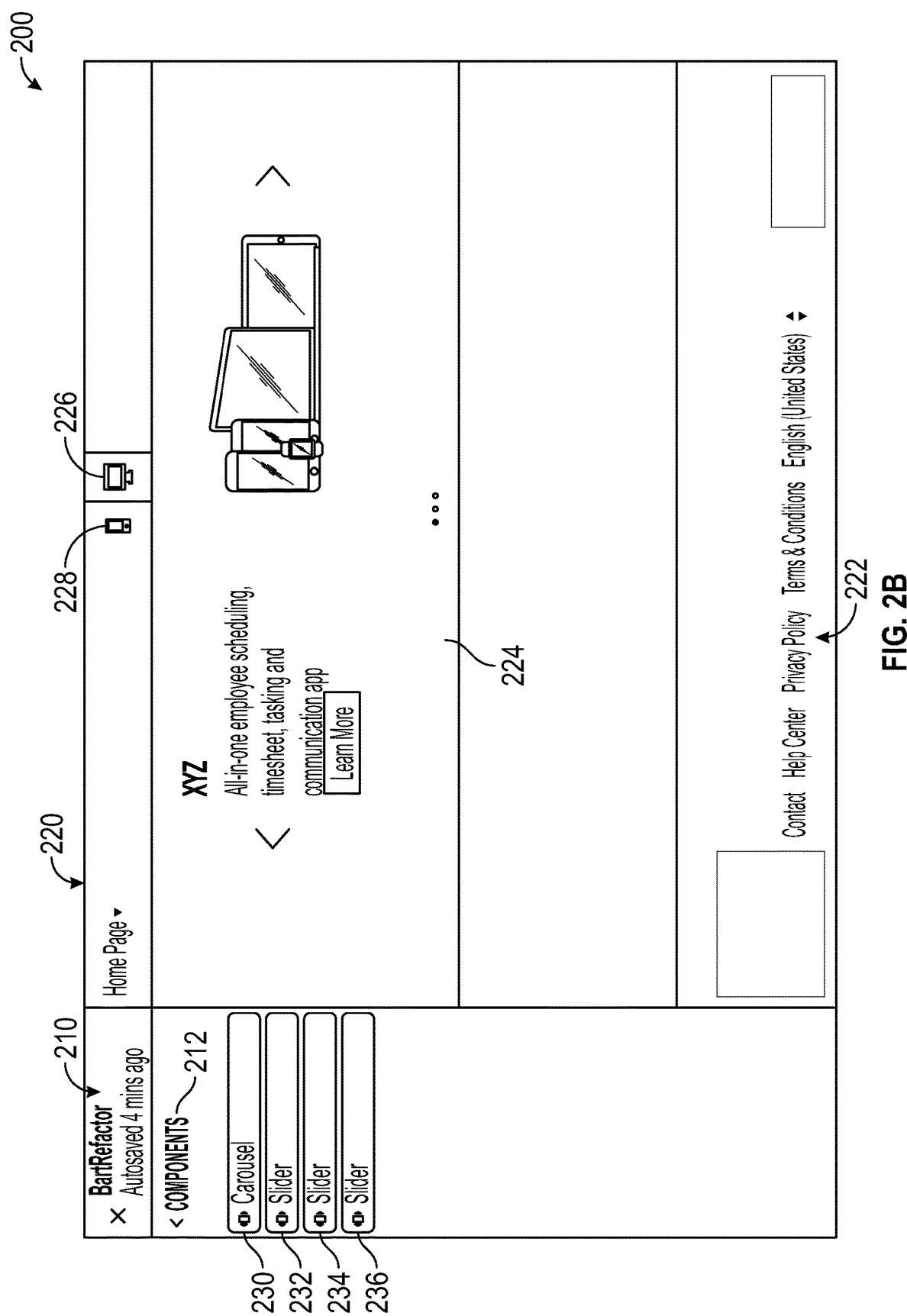
Figure 2C:
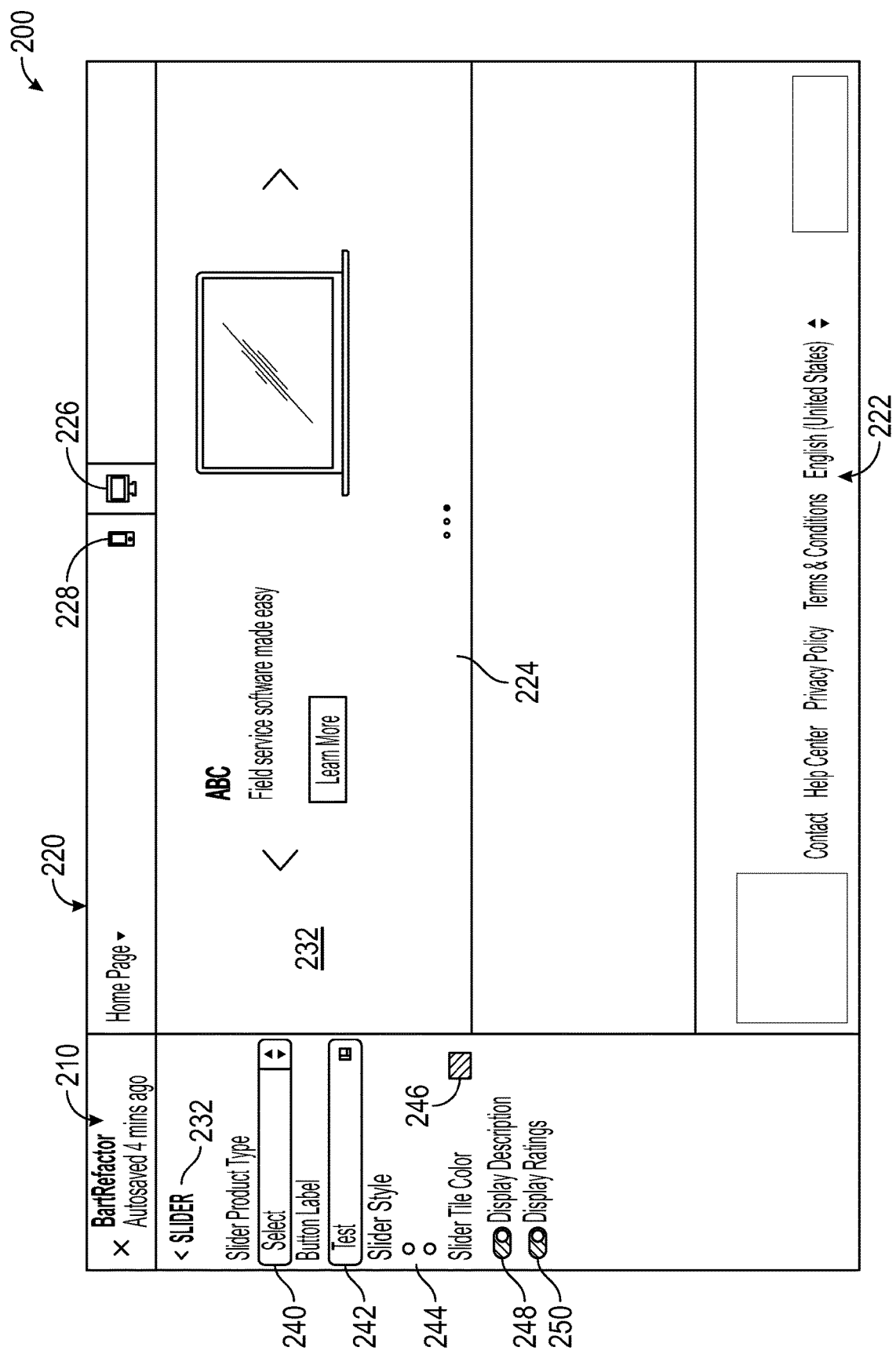

FIGS. 2A-2C illustrate exemplary graphical user interfaces (GUIs) 200 for customizing website elements, according to certain aspects of the disclosure. Referring to FIG. 2A, the GUI 200 may include an editing panel 210 and a preview panel 220. For example, the editing panel 210 may include customizable elements for components 212, transitions 214, and styles 216. It is understood that additional customizable elements may be included without departing from the scope of the disclosure. The customizable elements 212-216 may correlate to customizable website elements (e.g., customizable website elements 132) of a website preview 222.

The preview panel 220 may include the website preview 222. For example, the website preview 222 may include a slider/carousel 224 preview. It is understood that additional website components may be displayed in the preview panel 220 without departing from the scope of the disclosure. The preview panel 220 may be configured to toggle between a mobile view 228 and a desktop view 226. For example, the mobile view 228 may display the website preview 222 as rendered on a mobile device, and the desktop view 226 may display the website preview 222 as rendered on a desktop/laptop. As illustrated in FIGS. 2A-2C, the desktop view 226 is displayed.

According to aspects, a user may select which customizable elements 212-216 to customize for implementation into the website (e.g., website 130). As illustrated in FIG. 2B, the components 212 may be selected for customization. Once selected, the editing panel 210 may be configured to display the customizable components 230-236. For example, a carousel 230, a first slider 232, a second slider 234, and/or a third slider 236 may be selected for customization. Once customizations are selected, the preview panel 220 will update the website preview 222 to display an updated slider/carousel 224 with the user-specified changes.

Referring to FIG. 2C, the first slider 232 may be selected for customization. Once selected, the editing panel 210 may be updated to display available customizations for the first slider 232. For example, slider product types 240, button labels 242, slider styles 244, slider colors 246, display description selector 248, and display ratings selector 250 may be displayed. It is understood that additional slider customizations may be included without departing from the scope of the disclosure. It is understood that customizations for the other sliders 234, 236 and the carousel 230 may be similarly displayed with similar functionalities. It is further understood that the GUIs 200 are exemplary only, and the editing panel 210 may include various field options, including, but not limited to, input text areas, drop down menus, boxes, color pickers, etc., without departing from the scope of the disclosure.

Figure 3A:
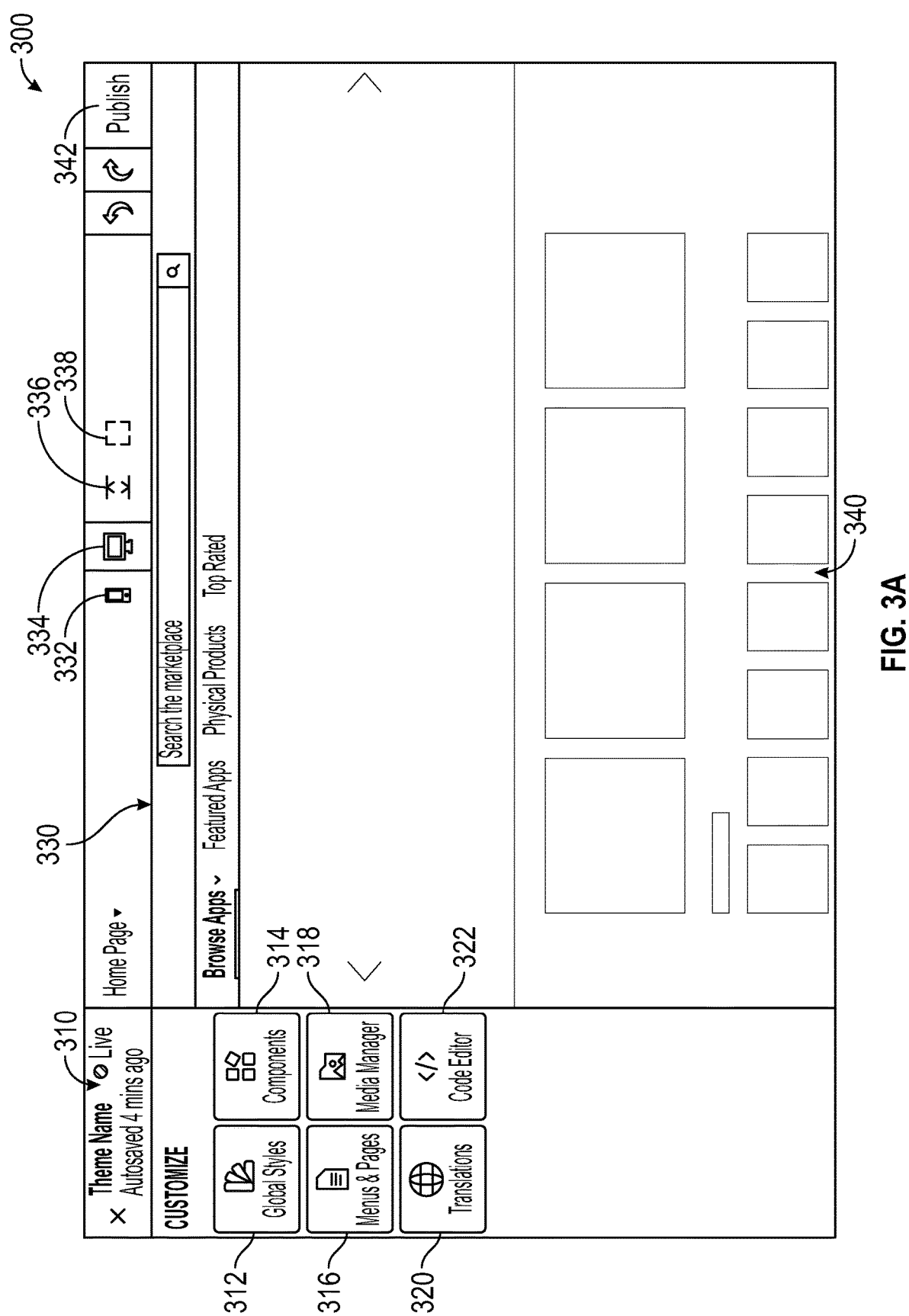
FIGS. 3A-3D illustrate additional exemplary graphical user interfaces (GUIs) for customizing website elements, according to certain aspects of the disclosure.

FIGS. 3A-3D illustrate additional exemplary graphical user interfaces (GUIs) 300 for customizing website elements, according to certain aspects of the disclosure. Referring to FIG. 3A, the GUI 300 may include an editing panel 310 and a preview panel 330. For example, the editing panel 310 may include customizable elements for global styles 312, components 314, menus 316, media manager 318, translations 320, and code editor 322. It is understood that additional customizable elements may be included without departing from the scope of the disclosure. The customizable elements 312-322 may correlate to customizable website elements (e.g., customizable website elements 132) of a website preview 340.

The preview panel 330 may include the website preview 340. For example, the website preview 340 may include a preview of customizable website components. It is understood that additional customizable website components may be displayed in the preview panel 330 without departing from the scope of the disclosure. The preview panel 330 may be configured to toggle between a mobile view 332, a desktop view 334, a fitted view 336, and a full view 338. For example, the mobile view 332 may display the website preview 340 as rendered on a mobile device, and the desktop view 334 may display the website preview 222 as rendered on a desktop/laptop. As illustrated in FIGS. 3A-3D, the desktop view 334 is displayed. The preview panel 330 may also include a publish button 342 to enable publishing of the website (e.g., website 130).

Figure 3B:
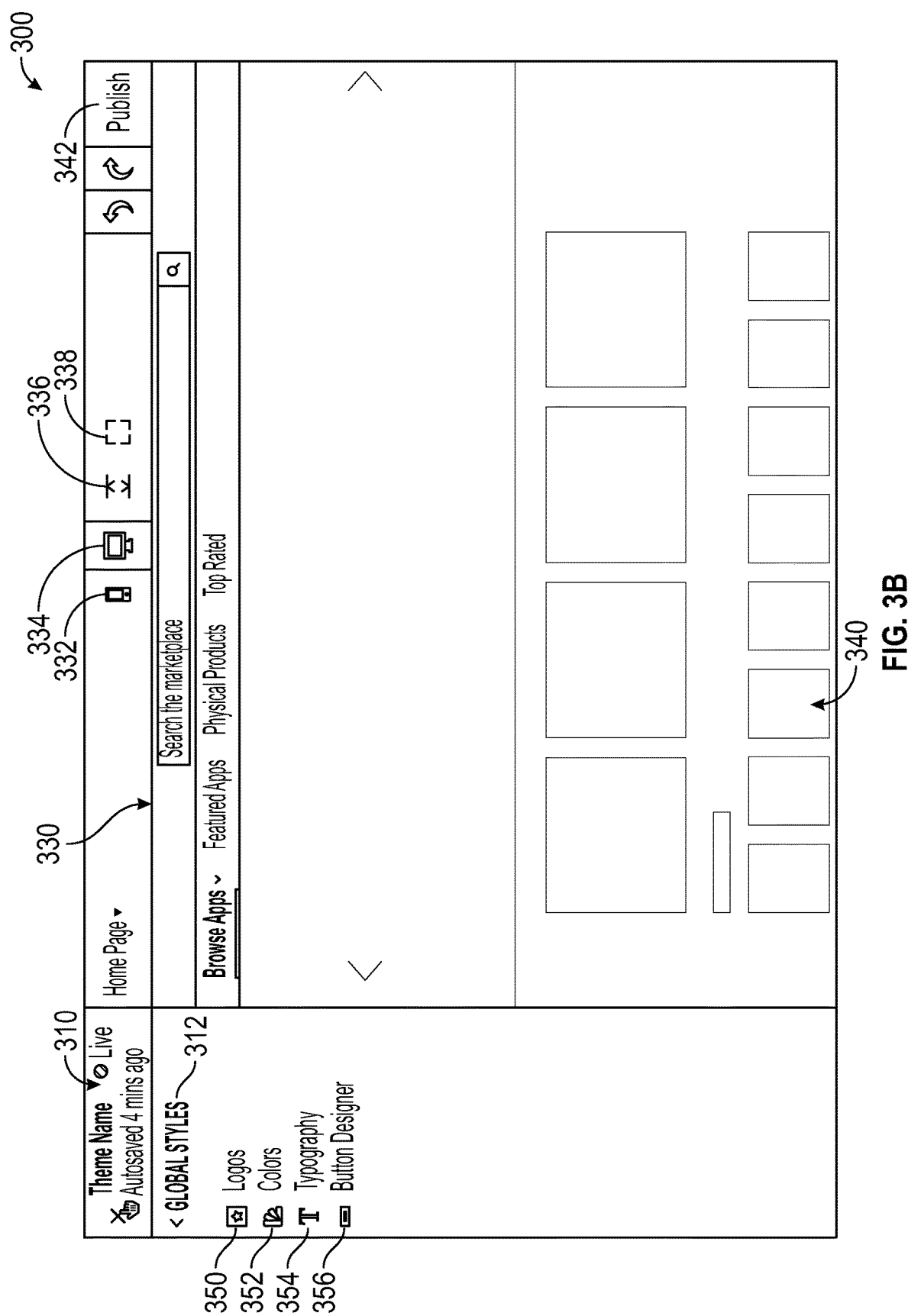

According to aspects, a user may select which customizable elements 312-322 to customize for implementation into the website. As illustrated in FIG. 3B, the global styles 312 may be selected for customization. Once selected, the editing panel 310 may be configured to display the customizable components 350-356. For example, logos 350, colors 352, typography 354, and button designer 356 may be selected for customization. Once customizations are selected, the preview panel 330 will update the website preview 340 to display an updated preview with the user-specified changes.

Figure 3C:
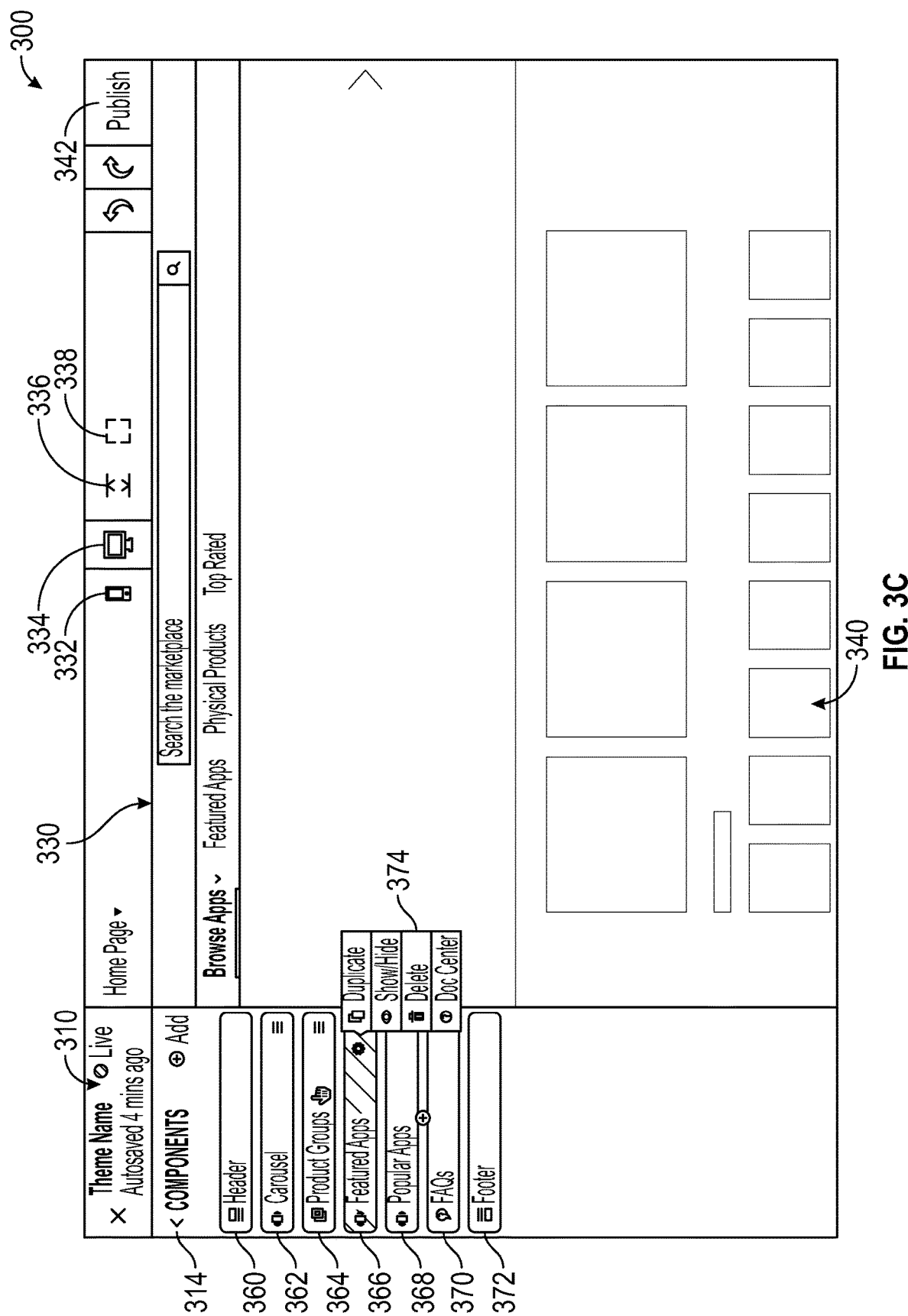

Referring to FIG. 3C, the components 314 may be selected for customization. For example, header 360, carousel 362, product groups 364, features applications 366, popular applications 368, frequently asked questions (FAQs) 370, and footer 372 may be selected for customization. According to aspects, hovering over a selection may toggle a sub-menu 374 to be displayed. For example, hovering over the featured applications 366 may display the sub-menu 374, which allows for duplicating, showing/hiding, deleting, and accessing a document center.

Figure 3D:
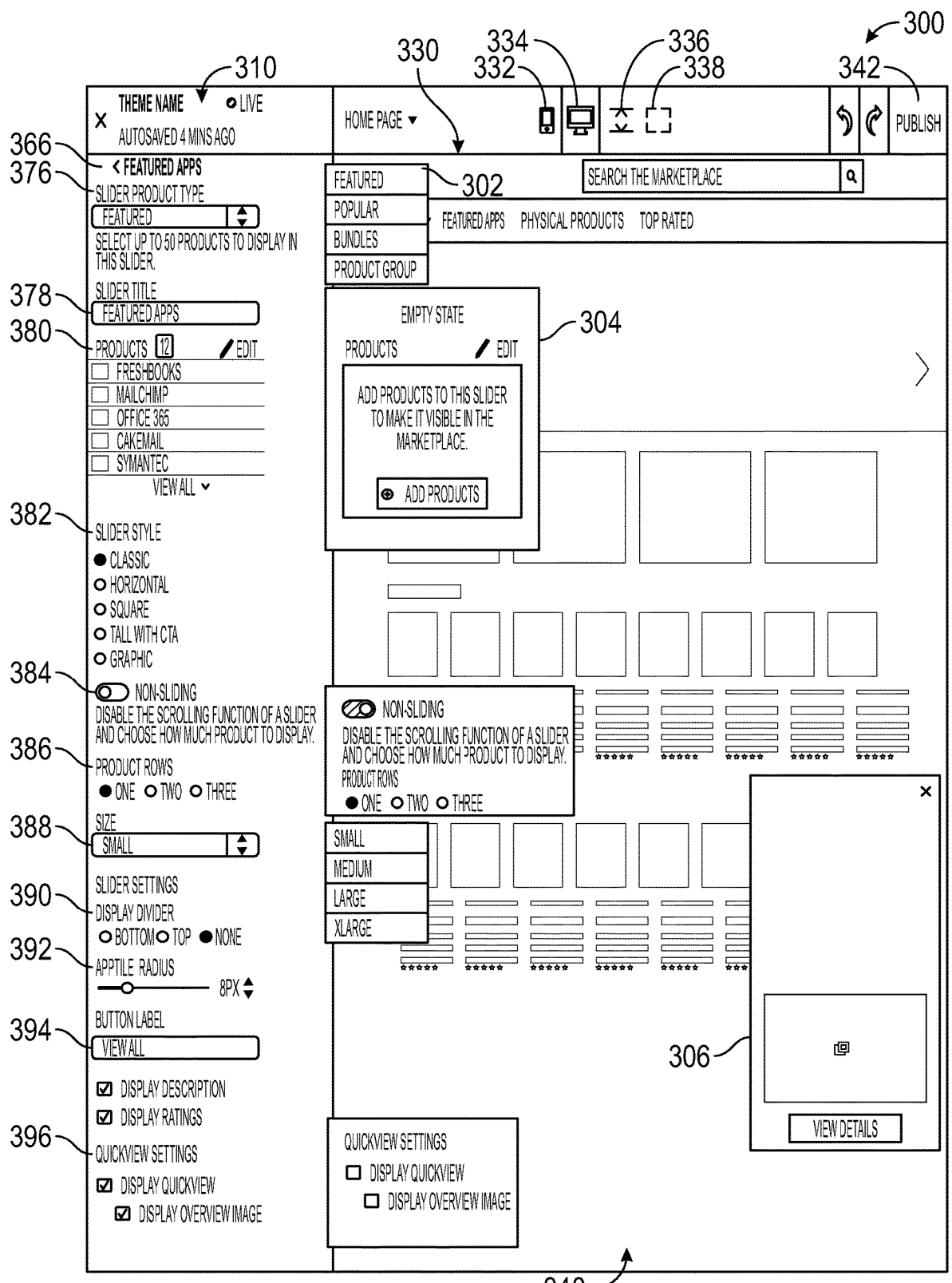

Referring to FIG. 3D, the featured applications 366 may be selected. Once selected, the editing panel 310 may be updated to display available customizations including, but not limited to, slider product type 376, slider title 378, products 380, slider style 382, option for sliding/non-sliding 384, product rows 386, size 388, slider settings 390, application tile radius 392, button label 394, and quickview settings 396. According to aspects, the slider product type 376 may include options 302 for featured, popular, bundles, and product group. According to aspects, customizing the features apps 366 may cause for display previews 304, 306 of the customized elements. For example, product preview 304 may be displayed as the products 380 are customized, and quickview preview 306 may be displayed as the quickview settings 396 are customized. It is understood that similar previews may be displayed as other components are customized.

It is understood that the GUIs 300 are exemplary only, and the editing panel 310 may include various field options, including, but not limited to, input text areas, drop down menus, boxes, color pickers, etc., without departing from the scope of the disclosure. It is further understood that the FIGS. (e.g., FIGS. 1-4) illustrate customizations for single website components as well as multiple website components. For example, referring to FIG. 3D, any of the customizations available through the editing panel 310 may be for single website components as well as multiple website components. As a further example, size 388, or any other customization, may be for single website components as well as multiple website components.

Figure 4:
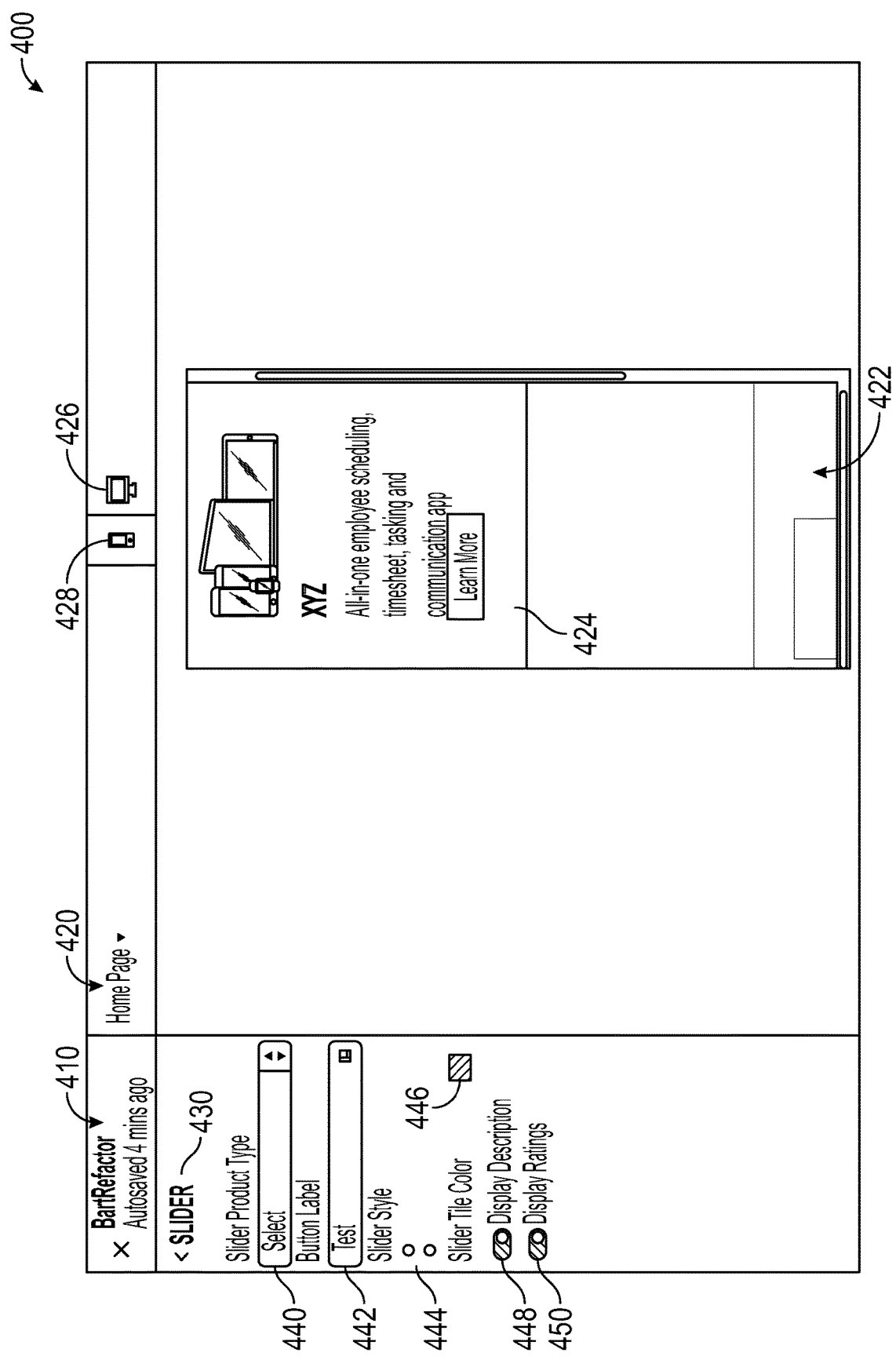
FIG. 4 illustrates an exemplary graphical user interface (GUI) for customizing website elements to be displayed to a mobile device, according to certain aspects of the disclosure.

FIG. 4 illustrates an exemplary graphical user interface (GUI) 400 for customizing website elements to be displayed to a mobile device, according to certain aspects of the disclosure. The GUI 400 may include an editing panel 410 and a preview panel 420. For example, a user may select to customize a slider 430. The editing panel 410 may accordingly display customization options for slider product type 440, button label 442, slider style 444, slider tile color 446, display description 448, and display ratings 450.

The preview panel 420 may include a website preview 422. For example, the website preview 422 may include a slider/carousel 424 preview. It is understood that additional website components may be displayed in the preview panel 420 without departing from the scope of the disclosure. The preview panel 420 may be configured to toggle between a mobile view 428 and a desktop view 426. For example, the mobile view 428 may display the website preview 422 as rendered on a mobile device, and the desktop view 426 may display the website preview 422 as rendered on a desktop/laptop. As illustrated in FIG. 4, the mobile view 428 is displayed.

Figure 5:
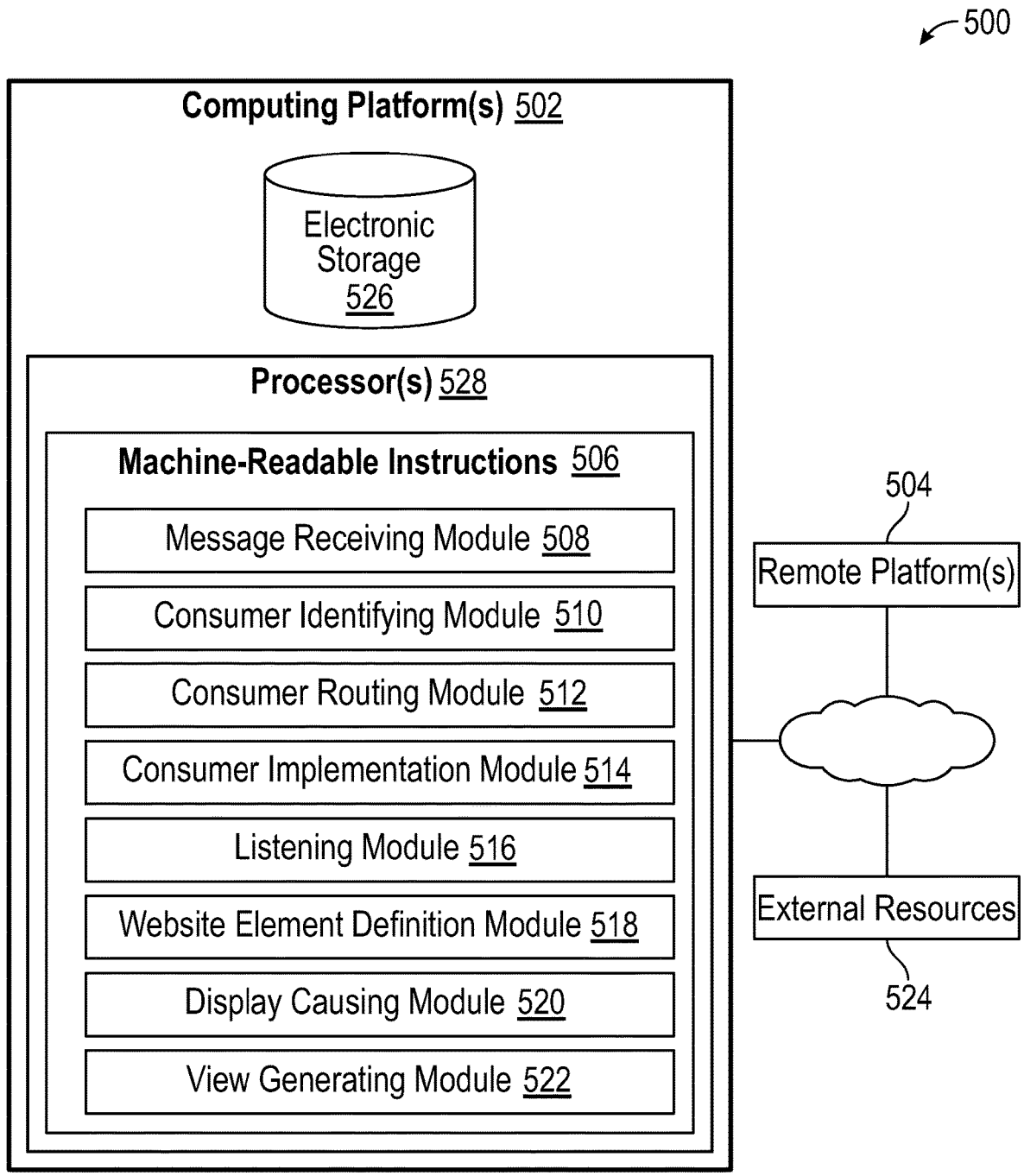
FIG. 5 illustrates a system configured for customizing a website, according to certain aspects of the disclosure.

FIG. 5 illustrates a system 500 configured for customizing a website, in accordance with one or more implementations. In some implementations, system 500 may include one or more computing platforms 502. Computing platform(s) 502 may be configured to communicate with one or more remote platforms 504 according to a client/server architecture, a peer-to-peer architecture, and/or other architectures. Remote platform(s) 504 may be configured to communicate with other remote platforms via computing platform(s) 502 and/or according to a client/server architecture, a peer-to-peer architecture, and/or other architectures. Users may access system 500 via remote platform(s) 504.

Computing platform(s) 502 may be configured by machine-readable instructions 506. Machine-readable instructions 506 may include one or more instruction modules. The instruction modules may include computer program modules. The instruction modules may include one or more of message receiving module 508, consumer identifying module 510, consumer routing module 512, consumer implementation module 514, listening module 516, website element definition module 518, display causing module 520, view generating module 522, and/or other instruction modules.

Message receiving module 508 may be configured to receive, from a provider, a message including message data. The provider may include a user interface. The message may be associated with a message listener configured to identify the message. The message data may include an identifier and parameters relating to a customizable website element of the website. The customizable website element may include a plurality of elements.

The customizable website element may include a single element with a unique identifier.

Consumer identifying module 510 may be configured to identify, through a consumer, the customizable website element based on at least one of a message type of the message or the identifier of the message data. The consumer may include an HTML element.

Consumer routing module 512 may be configured to route, through the consumer, the message to the customizable website element based on at least one of the message type of the message or the identifier of the message data.

Consumer implementation module 514 may be configured to implement, through the consumer, the parameters to the customizable website element based on the identifier.

Listening module 516 may be configured to listen, by the consumer, for messages posted by the provider.

Website element definition module 518 may be configured to define a plurality of customizable website elements for the website.

Display causing module 520 may be configured to cause for display a preview of the website including the implemented parameters.

View generating module 522 may be configured to generate a mobile view of the website.

In some implementations, computing platform(s) 502, remote platform(s) 504, and/or external resources 524 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 502, remote platform(s) 504, and/or external resources 524 may be operatively linked via some other communication media.

A given remote platform 504 may include one or more processors configured to execute computer program modules. The computer program modules may be configured to enable an expert or user associated with the given remote platform 504 to interface with system 500 and/or external resources 524, and/or provide other functionality attributed herein to remote platform(s) 504. By way of non-limiting example, a given remote platform 504 and/or a given computing platform 502 may include one or more of a server, a desktop computer, a laptop computer, a handheld computer, a tablet computing platform, a NetBook, a Smartphone, a gaming console, and/or other computing platforms.

External resources 524 may include sources of information outside of system 500, external entities participating with system 500, and/or other resources. In some implementations, some or all of the functionality attributed herein to external resources 524 may be provided by resources included in system 500.

Computing platform(s) 502 may include electronic storage 526, one or more processors 528, and/or other components. Computing platform(s) 502 may include communication lines, or ports to enable the exchange of information with a network and/or other computing platforms. Illustration of computing platform(s) 502 in FIG. 5 is not intended to be limiting. Computing platform(s) 502 may include a plurality of hardware, software, and/or firmware components operating together to provide the functionality attributed herein to computing platform(s) 502. For example, computing platform(s) 502 may be implemented by a cloud of computing platforms operating together as computing platform(s) 502.

Electronic storage 526 may comprise non-transitory storage media that electronically stores information. The electronic storage media of electronic storage 526 may include one or both of system storage that is provided integrally (i.e., substantially non-removable) with computing platform(s) 502 and/or removable storage that is removably connectable to computing platform(s) 502 via, for example, a port (e.g., a USB port, a firewire port, etc.) or a drive (e.g., a disk drive, etc.). Electronic storage 526 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 526 may include one or more virtual storage resources (e.g., cloud storage, a virtual private network, and/or other virtual storage resources). Electronic storage 526 may store software algorithms, information determined by processor(s) 528, information received from computing platform(s) 502, information received from remote platform(s) 504, and/or other information that enables computing platform(s) 502 to function as described herein.

Processor(s) 528 may be configured to provide information processing capabilities in computing platform(s) 502. As such, processor(s) 528 may include one or more of a digital processor, an analog processor, a digital circuit designed to process information, an analog circuit designed to process information, a state machine, and/or other mechanisms for electronically processing information. Although processor(s) 528 is shown in FIG. 5 as a single entity, this is for illustrative purposes only. In some implementations, processor(s) 528 may include a plurality of processing units. These processing units may be physically located within the same device, or processor(s) 528 may represent processing functionality of a plurality of devices operating in coordination. Processor(s) 528 may be configured to execute modules 508, 510, 512, 514, 516, 518, 520, and/or 522, and/or other modules. Processor(s) 528 may be configured to execute modules 508, 510, 512, 514, 516, 518, 520, and/or 522, and/or other modules by software; hardware; firmware; some combination of software, hardware, and/or firmware; and/or other mechanisms for configuring processing capabilities on processor(s) 528. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 508, 510, 512, 514, 516, 518, 520, and/or 522 are illustrated in FIG. 5 as being implemented within a single processing unit, in implementations in which processor(s) 528 includes multiple processing units, one or more of modules 508, 510, 512, 514, 516, 518, 520, and/or 522 may be implemented remotely from the other modules. The description of the functionality provided by the different modules 508, 510, 512, 514, 516, 518, 520, and/or 522 described below is for illustrative purposes, and is not intended to be limiting, as any of modules 508, 510, 512, 514, 516, 518, 520, and/or 522 may provide more or less functionality than is described. For example, one or more of modules 508, 510, 512, 514, 516, 518, 520, and/or 522 may be eliminated, and some or all of its functionality may be provided by other ones of modules 508, 510, 512, 514, 516, 518, 520, and/or 522. As another example, processor(s) 528 may be configured to execute one or more additional modules that may perform some or all of the functionality attributed below to one of modules 508, 510, 512, 514, 516, 518, 520, and/or 522.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 6:
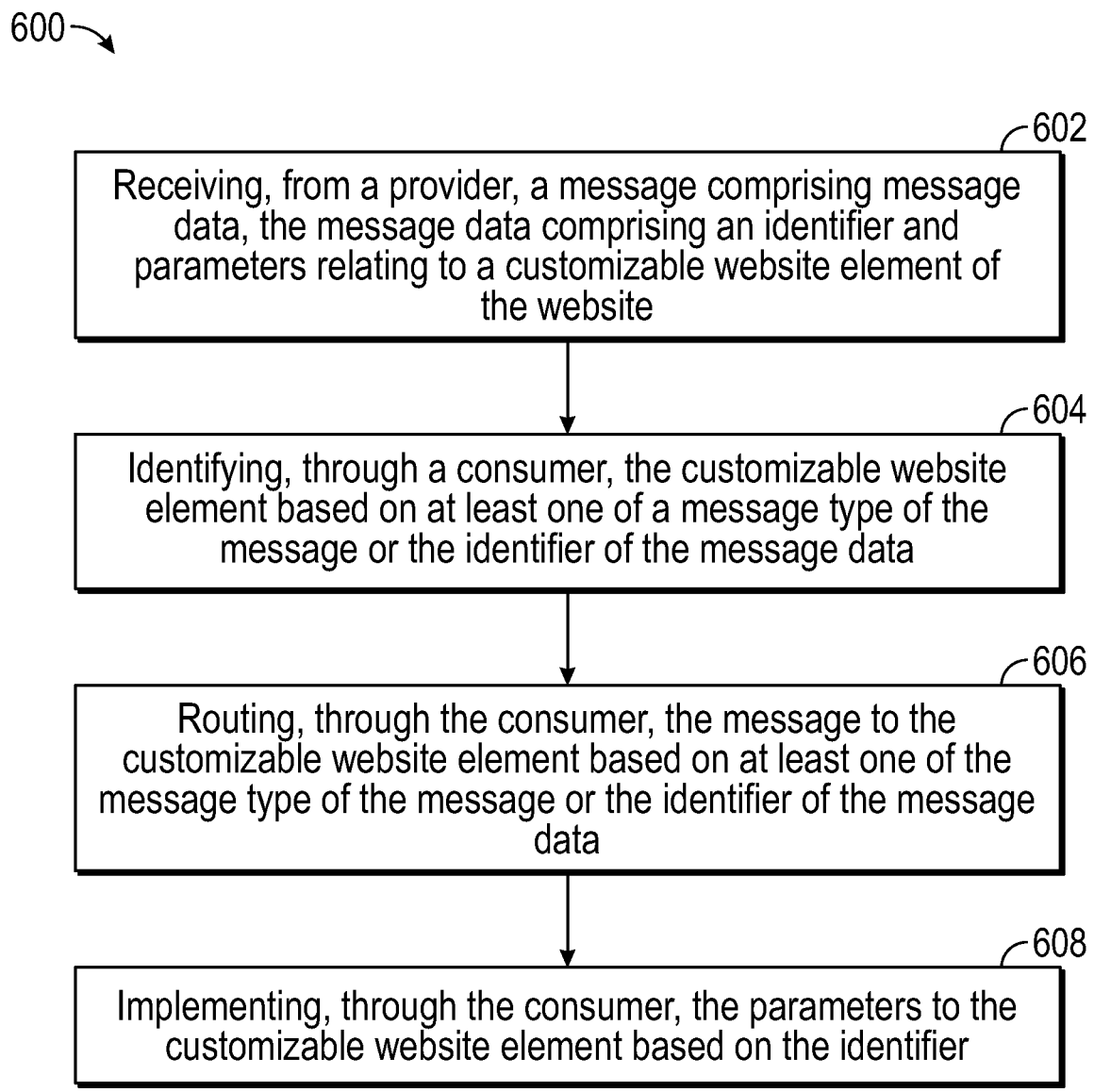
FIG. 6 illustrates an example flow chart for customizing website elements, according to certain aspects of the disclosure.

FIG. 6 illustrates an example flow chart (e.g., process 600) for customizing a website, according to certain aspects of the disclosure. For explanatory purposes, the example process 600 is described herein with reference to FIGS. 1-4. Further for explanatory purposes, the steps of the example process 600 are described herein as occurring in serial, or linearly. However, multiple instances of the example process 600 may occur in parallel. For purposes of explanation of the subject technology, the process 600 will be discussed in reference to FIGS. 1-4.

At step 602, a message is received from a provider comprising message data, the message data comprising an identifier and parameters relating to a customizable website element of the website. At step 604, the customizable website element is identified through a consumer based on at least one of a message type of the message or the identifier of the message data. At step 606, the message is routed through the consumer to the customizable website element based on at least one of the message type of the message or the identifier of the message data. At step 608, the parameters are implemented through the consumer to the customizable website element based on the identifier.

For example, as described above in relation to FIGS. 1-4, at step 602, a message (e.g., message 102) is received from a provider (e.g., provider 110) comprising message data, the message data comprising an identifier and parameters (e.g., parameters 104) relating to a customizable website element (e.g., customizable website element 132) of a website (e.g., website 130). At step 604, the customizable website element (e.g., customizations 212-216, 312-322, and 430) is identified through a consumer (e.g., consumer 120) based on at least one of a message type of the message or the identifier of the message data. At step 606, the message is routed through the consumer to the customizable website element based on at least one of the message type of the message or the identifier of the message data. At step 608, the parameters are implemented through the consumer to the customizable website element based on the identifier (e.g., via publisher 342).

According to an aspect, the process 600 further includes listening, by the consumer, for messages posted by the provider. According to an aspect, the consumer comprises an HTML element. According to an aspect, the provider comprises a user interface.

According to an aspect, the process 600 further includes defining a plurality of customizable website elements for the website. According to an aspect, customizable website element comprises a plurality of elements. According to an aspect, the customizable website element comprises a single element with a unique identifier.

According to an aspect, the message is associated with a message listener configured to identify the message. According to an aspect, the process 600 further includes causing for display a preview of the website including the implemented parameters. According to an aspect, the process 600 further includes generating a mobile view of the website.

Figure 7:
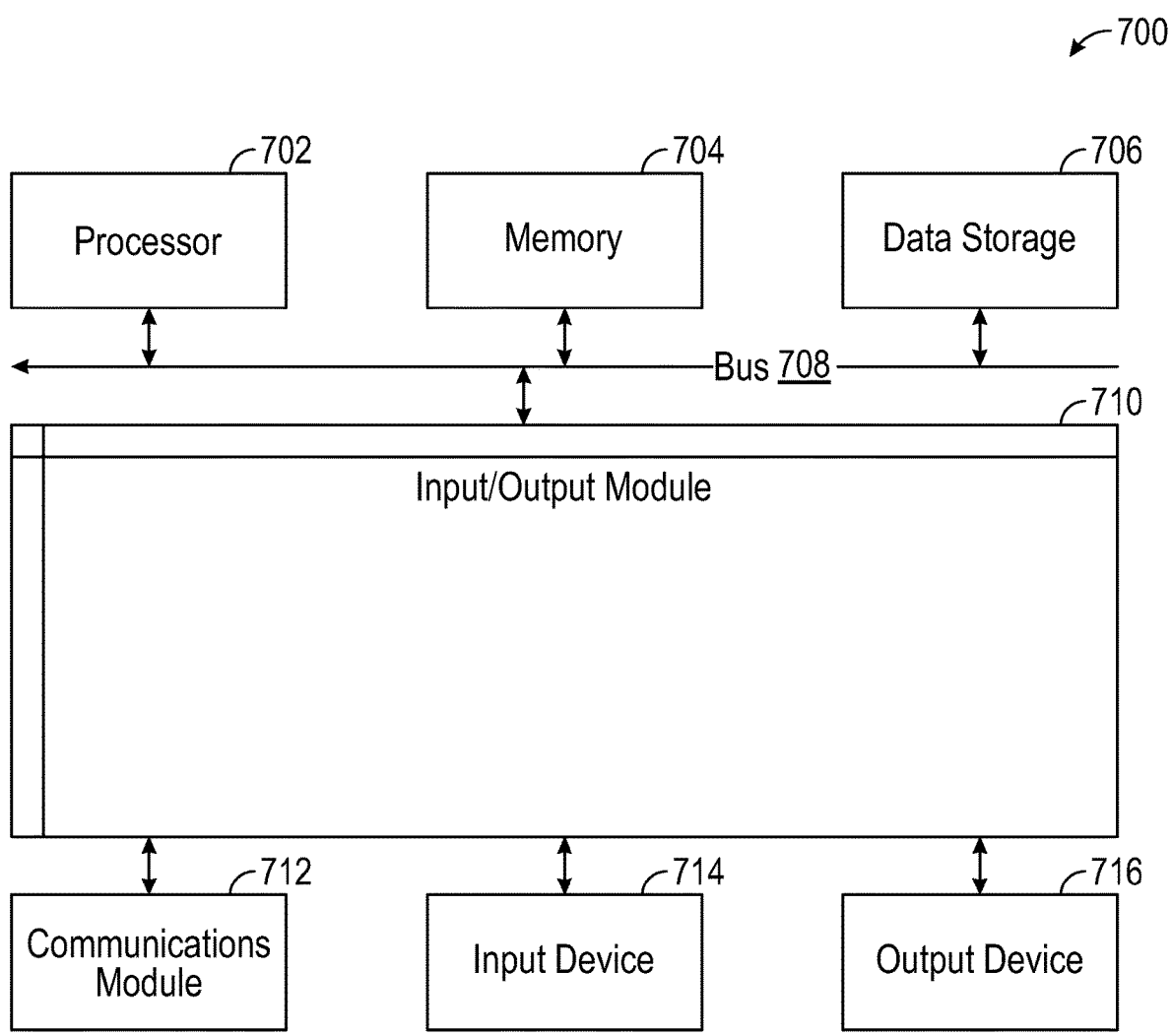
FIG. 7 is a block diagram illustrating an example computer system (e.g., representing both client and server) with which aspects of the subject technology can be implemented.

FIG. 7 is a block diagram illustrating an exemplary computer system 700 with which aspects of the subject technology can be implemented. In certain aspects, the computer system 700 may be implemented using hardware or a combination of software and hardware, either in a dedicated server, integrated into another entity, or distributed across multiple entities.

Computer system 700 (e.g., server and/or client) includes a bus 708 or other communication mechanism for communicating information, and a processor 702 coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, i.e., one or more modules of computer program instructions encoded on a computer-readable medium for execution by, or to control the operation of, the computer system 700, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Exemplary input/output modules 710 include data ports such as USB ports. The input/output module 710 is configured to connect to a communications module 712. Exemplary communications modules 712 include networking interface cards, such as Ethernet cards and modems. In certain aspects, the input/output module 710 is configured to connect to a plurality of devices, such as an input device 714 and/or an output device 716. Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 716 include display devices such as an LCD (liquid crystal display) monitor, for displaying information to the user.

According to one aspect of the present disclosure, the above-described gaming systems can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in the main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 700 reads game data and provides a game, information may be read from the game data and stored in a memory device, such as the memory 704. Additionally, data from the memory 704 servers accessed via a network or the bus 708, or the data storage 706 may be read and loaded into the memory 704. Although data is described as being found in the memory 704, it will be understood that data does not have to be stored in the memory 704 and may be stored in other memory accessible to the processor 702 or distributed among several media, such as the data storage 706.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for customizing a website, comprising:
   receiving, from a provider, a message comprising message data, the message data comprising an identifier and parameters relating to a customizable website element of the website, wherein there is a one-to-one correlation between the customizable website element and the identifier, the customizable website element comprising at least a slider/carousel element, and the parameters comprising at least a number of images to be displayed by the slider/carousel element and user-configurable settings defined by a user;
   listening, by the consumer, for the message posted by the provider;
   identifying, through a consumer, the customizable website element based on at least one of a message type of the message or the identifier of the message data, wherein the message type comprises a first message type or a second message type, the first message type comprising code for logic-specific implementation, the second message type comprising styling preferences of specific components of the customizable website element;
   routing, through the consumer, the message to the customizable website element based on at least one of the message type of the message or the identifier of the message data; and
   implementing, through the consumer, the parameters to the customizable website element based on the identifier.

2. The computer-implemented method of claim 1, further comprising:
   listening, by the consumer, for additional messages posted by the provider.

3. The computer-implemented method of claim 1, wherein the consumer comprises an HTML element.

4. The computer-implemented method of claim 1, wherein the provider comprises a user interface.

5. The computer-implemented method of claim 1, further comprising:
   defining a plurality of customizable website elements for the website.

6. The computer-implemented method of claim 1, wherein the customizable website element comprises a plurality of elements.

7. The computer-implemented method of claim 1, wherein the customizable website element comprises a single element with a unique identifier.

8. The computer-implemented method of claim 1, wherein the message is associated with a message listener configured to identify the message.

9. The computer-implemented method of claim 1, further comprising:
   causing for display a preview of the website including the implemented parameters.

10. The computer-implemented method of claim 1, further comprising:
    generating a mobile view of the website.

11. A system for customizing a website, comprising:
    a processor; and
    a memory comprising instructions stored thereon, which when executed by the processor, causes the processor to perform:
      receiving, from a provider, a message comprising message data, the message data comprising an identifier and parameters relating to a customizable website element of the website, wherein there is a one-to-one correlation between the customizable website element and the identifier, the customizable website element comprising at least a slider/carousel element, and the parameters comprising at least a number of images to be displayed by the slider/carousel element and user-configurable settings defined by a user;

listening, by the consumer, for the message posted by the provider;

identifying, through a consumer, the customizable website element based on at least one of a message type of the message or the identifier of the message data, wherein the message type comprises a first message type or a second message type, the first message type comprising code for logic-specific implementation, the second message type comprising styling preferences of specific components of the customizable website element;

routing, through the consumer, the message to the customizable website element based on at least one of the message type of the message or the identifier of the message data; and implementing, through the consumer, the parameters to the customizable website element based on the identifier.

12. The system of claim 11, further comprising stored sequences of instructions, which when executed by the processor, cause the processor to perform:

listening, by the consumer, for additional messages posted by the provider.

13. The system of claim 11, wherein the consumer comprises an HTML element.

14. The system of claim 11, wherein the provider comprises a user interface.

15. The system of claim 11, further comprising stored sequences of instructions, which when executed by the processor, cause the processor to perform:

defining a plurality of customizable website elements for the website.

16. The system of claim 11, wherein the customizable website element comprises a plurality of elements.

17. The system of claim 11, wherein the customizable website element comprises a single element with a unique identifier.

18. The system of claim 11, wherein the message is associated with a message listener configured to identify the message.

19. The system of claim 11, further comprising stored sequences of instructions, which when executed by the processor, cause the processor to perform:

causing for display a preview of the website including the implemented parameters.

20. A non-transitory computer-readable storage medium is provided including instructions that, when executed by a processor, causes the processor to perform a method for customizing a website, comprising:

receiving, from a provider, a message comprising message data, the message data comprising an identifier and parameters relating to a customizable website element of the website, wherein there is a one-to-one correlation between the customizable website element and the identifier, the customizable website element comprising at least a slider/carousel element, and the parameters comprising at least a number of images to be displayed by the slider/carousel element and user-configurable settings defined by a user;

listening, by the consumer, for the message posted by the provider;

identifying, through a consumer, the customizable website element based on at least one of a message type of the message or the identifier of the message data, wherein the message type comprises a first message type or a second message type, the first message type comprising code for logic-specific implementation, the second message type comprising styling preferences of specific components of the customizable website element;

routing, through the consumer, the message to the customizable website element based on at least one of the message type of the message or the identifier of the message data; and implementing, through the consumer, the parameters to the customizable website element based on the identifier.

* * * * *